Figure 1:
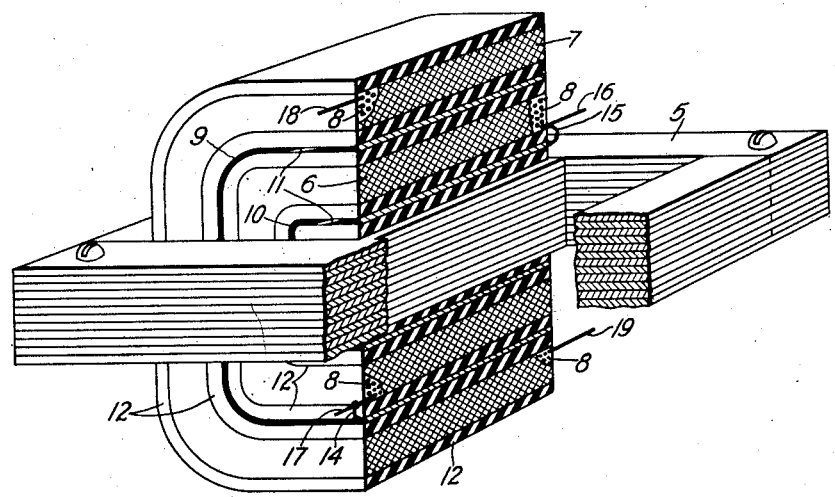

Dec. 22, 1931.  E. B. WHEELER  1,837,245
INDUCTANCE DEVICE
Filed May 5, 1928

INVENTOR
EDMUND B. WHEELER
BY
*J. H. A. Burgess*
ATTORNEY

Patented Dec. 22, 1931

1,837,245

UNITED STATES PATENT OFFICE

EDMUND B. WHEELER, OF NEW YORK, N. Y., ASSIGNOR, BY MESNE ASSIGNMENTS, TO WESTERN ELECTRIC COMPANY, INCORPORATED, A CORPORATION OF NEW YORK

INDUCTANCE DEVICE

Application filed May 5, 1928. Serial No. 275,341.

This invention relates to inductance devices and particularly to transformers, retard coils, and relays.

An object of this invention is to provide shielding for inductance devices for preventing electrolytic corrosion or deterioration of their windings and insulation when a direct current potential is connected thereto.

It is another object of the present invention to improve the mechanical construction of inductance devices, to increase the life of these devices and to provide a more compact and efficient piece of apparatus of this type.

Shielding in transformer construction has been used heretofore for such purposes as reducing capacity and electrostatic effects, or for controlling the effect of leakage flux between windings. Such shielding has been used to improve and stabilize the electrical characteristics of coils and transformers to which it has been applied.

Transformers, retard coils or relay coils, when used in many situations, for instance, when associated with vacuum tubes, frequently have their cores grounded or at least one winding at substantially ground potential or at a negative potential while another winding is connected to a source of positive direct current potential. There exists therefore, a difference in direct current potential between a winding and another part of the inductance device.

It is usually desirable in retard coils and transformers to associate the windings and the turns of each winding as intimately as practicable to increase the mutual inductance between windings and to reduce the leakage inductance of individual windings. Overall compactness is also a desirable feature to conserve space in systems where the device is used. To obtain this result wires of small dimensions having very thin insulation are preferred. However, if a difference in direct current potential exists between the windings or the windings and the core, electrolytic action may be set up and if severe enough may cause a breakdown of the insulation or short-circuit or break in a circuit.

This invention provides for compact construction and prevents deterioration of the windings due to electrolytic action. The method of shielding in this invention is to provide shields between windings at different potentials or between windings and other portions of the device between which different potentials exist, and to conductively connect the shields to the adjacent positive potential windings. By so doing the shield is at a high potential as well as the windings and any electrolytic action occurring will take place from the shield, the winding being unaffected and unharmed.

Figure 2:
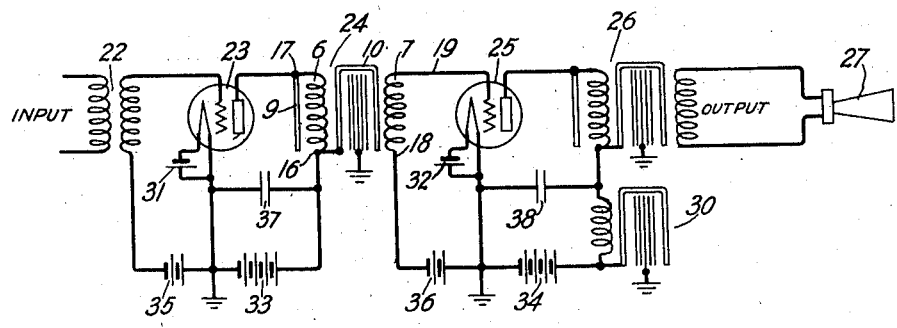

A complete description of the shield construction as applied to a transformer will be set forth in connection with the accompanying drawings in which:

Fig. 1 is a sectional perspective view of a core type transformer embodying the invention, and Fig. 2 shows the manner of connecting such a transformer into a vacuum tube amplifier circuit as well as the manner of connecting a retard coil embodying the invention into the circuit.

The transformer of Fig. 1 is one having a well-known type of laminated core 5, a portion of which is cut away to show the center leg upon which a primary winding 6 and a secondary winding 7 are wound. These windings are shown in cross-section so that the individual turns may be seen at points 8. These windings may be of copper with an enamel insulation. In accordance with the invention, a shield 9 is placed between the primary winding 6 and the secondary winding 7 while a shield 10 is placed between the center leg of the core 5 and the primary winding 6. These shields, which may be of copper or tinfoil, overlap but are prevented from forming a short-circuited turn by insulation 11 between the overlapped portions. Other insulation 12, separating the shield 10 from the center leg of core 5 and the winding 6, and shield 9 from both windings, and covering the transformer, may be of paper, cloth, tape or like material. Shield 9 is conductively connected by a connection 14 to the outer or adjacent layer of the primary winding 6, while shield 10 is conductively connected by a connection 15 to the inner or adjacent layer of this winding. Terminals 16 and 17 are those of the primary, and terminals 18 and 19 are those of the secondary winding.

Fig. 2 shows the manner in which the terminals above mentioned connect to a vacuum tube amplifier circuit. An input transformer 22 supplies vacuum tube 23 with signals to be amplified while the output transformer 24 of Fig. 1 is connected as an interstage transformer with its primary 6 in the plate circuit of the tube 23 and its secondary 7 in the input circuit of a vacuum tube 25. A second transformer 26 shielded in the same manner as transformer 24 is in the output circuit of the vacuum tube 25 and associates this circuit with a load which may be a loud speaker 27. A choke or retardation coil 30, embodying the invention, is shown in the output circuit of the tube 25. This retardation coil has a single shield comparable with the inner shields of the transformers 24 and 26. The other elements of this amplifier circuit such as filament heating batteries 31 and 32, plate potential batteries 33 and 34, grid biasing batteries 35 and 36 and by-pass condensers 37 and 38, perform their usual functions.

To improve the stability of this system the filaments or the negative terminals of batteries 33 and 34 are grounded as well as the cores of the transformers 24 and 26 and the core of the retardation coil 30, which is well-known practice in the art. The terminal 16 of the transformer 24 of Fig. 1 is connected to the positive pole of the battery 33 and terminal 17 is connected to the plate of the vacuum tube 23. The potential therefore of the shield 10 is that of the positive terminal of the battery 33 while the potential of the shield 9 is the same, less the drop across the primary winding 6. In this construction, the lateral surfaces of the primary winding 6 are completely insulated electrolytically by the shields 9 and 10. In usual practice a spool head separates the ends of the coils from the core so an enveloping shield for the primary is unnecessary. There is no drop in potential between any point on the conductors and the shields sufficient to cause any substantial destructive deterioration. There does exist, however, a potential difference between the shields and core approximately equal to the potential of battery 33, while the potential difference between the shields and the secondary winding 7 is approximately equal to the potential of battery 33 plus the potential of the battery 36. This condition is substantially true with respect to transformer 26 and retardation coil 30.

Any electrolytic action taking place within these transformers or the retard coil will occur from the shields to the core or low potential windings. Since it is well-known that deterioration is present at the positive pole, the shields forming such pole will protect the windings from any corrosive damage since they are interposed between the different points of potential difference. This construction, therefore, prevents a breakdown in the thin enamel insulation or a short-circuiting of the turns, permitting the devices to have a much longer life than formerly especially when constructed of small diameter wire.

Although this invention has been described in connection with specific types of inductance devices it is also applicable to other types of apparatus in which a difference of direct current potential exists between any two elements.

What is claimed is:

1. In combination, an inductance device comprising elements of electrically conducting material, one of which is a winding, said winding being in close proximity to another of said elements, a source of direct current potential connected between said winding and said other element, and means for preventing electrolytic corrosion of said winding by current from said source, said means comprising a metallic shield intermediate said winding and said other element, said shield being conductively connected to said winding.

2. In combination, an inductance device comprising a core, a winding on said core, a source of direct current potential connected between said winding and said core, and means for preventing electrolytic corrosion of said winding by current from said source, said means comprising a metallic shield intermediate said winding and said core, said shield being conductively connected to said winding.

3. In combination, an inductance device according to claim 2 in which said shield is insulated from said core and from said winding except for the point of connection to said winding, and has an overlapping joint, said joint being insulated to prevent said shield from forming a short-circuited turn.

4. In combination, an inductance device comprising a plurality of windings, a source of direct current potential between at least two of said windings, and means for preventing electrolytic corrosion of said windings by current from said source, said means comprising a metallic shield intermediate said two windings, said shield being conductively connected to the winding having the positive potential connected thereto.

5. In combination, an inductance device in accordance with claim 4 in which said shield is insulated from said core and from said windings except for the point of connection to said winding having the positive potential connected thereto, and has an overlapping joint, said joint being insulated to prevent said shield from forming a short-circuited turn.

6. In combination, an inductance device comprising a core, a plurality of multi-layer windings on said core, one of said windings and said core being at substantially ground potential, a source of direct current potential, the negative terminal being connected to said grounded winding and core and the positive terminal being connected to another of said windings, and means for preventing electrolytic corrosion of said winding by current from said source, said means comprising a metallic shield between said core and said winding at positive potential conductively connected to said positive potential winding, and a second metallic shield between said grounded winding and said winding at positive potential conductively connected to said positive potential winding.

7. In combination, an inductance device in accordance with claim 6 in which said shields are insulated from said core and from said windings except for the point of connection to said winding, and have overlapping joints, and are connected to the adjacent layers of said high potential winding, said joints being insulated to prevent said shields from forming short-circuited turns.

8. In a transformer system primary and secondary windings having a difference of potential therebetween, and means located between said windings and charged to a potential higher than the potentials existing in said windings for governing the direction of flow of the leakage current between said windings.

9. In a transformer system primary and secondary windings having a difference of potential therebetween, and means disposed adjacent said windings and charged at a positive potential substantially greater than the potentials existing in said windings for governing the direction of flow of the leakage current between said windings.

10. In a transformer system primary and secondary windings inductively related one to the other and an element disposed adjacent said windings, said element being charged at a high potential with respect to said windings, whereby the direction of flow of the leakage current between said windings is governed.

11. In an inductance device, elements of electrically conducting material having a difference of potential therebetween, at least one of said elements being a winding, and means located between said winding and another of said elements and charged to a potential higher than the potentials existing in said winding and said other element for governing the direction of flow of the leakage current between said winding and said other element.

12. In a transformer system, primary and secondary windings having difference of potential therebetween, and means located between said windings and conductively connected to the winding whose potential is positive with respect to the other winding for governing the direction of flow of the leakage current between said windings.

In witness whereof, I hereunto subscribe my name this 3rd day of May, 1928.
EDMUND B. WHEELER.